United States Patent [19]

Ferguson

[11] 4,328,661
[45] May 11, 1982

[54] CROSS FLOW ROTARY MOWER HAVING AN AXIAL EXPANSION SECTION

[75] Inventor: Hugo S. Ferguson, Averill Park, N.Y.

[73] Assignee: Duffers Associates, Inc., Poestenkill, N.Y.

[21] Appl. No.: 186,445

[22] Filed: Sep. 12, 1980

[51] Int. Cl.³ ............................................ A01D 35/26
[52] U.S. Cl. .................... 56/13.4; 56/320.2; 415/54
[58] Field of Search .................. 56/13.4, 13.3, 320.1, 56/320.2; 415/54

[56] References Cited

U.S. PATENT DOCUMENTS

| | | | |
|---|---|---|---|
| B 494,167 | 3/1976 | Comer | 56/13.4 |
| 3,144,202 | 8/1964 | Helmbold | 415/54 |
| 3,415,443 | 12/1968 | Glucksman | 415/54 |
| 3,541,771 | 11/1970 | Schulze | 56/320.2 |
| 3,608,291 | 9/1971 | Kidd | 56/320.1 |
| 3,673,772 | 7/1972 | Holzhei | 415/54 |
| 3,888,072 | 6/1975 | Templeton | 56/13.4 |
| 4,257,214 | 3/1981 | Ferguson et al. | 56/13.4 |

FOREIGN PATENT DOCUMENTS

397137 2/1966 Sweden .................. 415/54

Primary Examiner—Gene Mancene
Assistant Examiner—John J. Wilson
Attorney, Agent, or Firm—Pennie & Edmonds

[57] ABSTRACT

A cross flow rotary type mower has a rotor (21) mounted for rotation about a vertical axis. A housing having an upper wall (10) and side walls (29, 30, 31) surrounds the rotor to form a cross-flow blower. A portion (37) of the upper wall is expanded axially of the rotor to provide an axially extending vortex chamber (36) within the housing. The blower has an air inlet region (26) and an air outlet region (18) where the outlet region has a greater vertical height then the inlet region.

8 Claims, 10 Drawing Figures

CROSS FLOW ROTARY MOWER HAVING AN AXIAL EXPANSION SECTION

TECHNICAL FIELD

This invention relates to a rotary type mower, and more particularly to a mower utilizing a cross flow blower action inducing movement of air through the mower.

CROSS-REFERENCE TO OTHER APPLICATIONS

This application relates to a cross flow rotary mower of the type disclosed in application Ser. No. 970,197 filed Dec. 18, 1978 now U.S. Pat. No. 4,257,214 dated Mar. 24, 1981 and assigned to the same assignee as this application.

BACKGROUND ART

Rotary mowers currently predominate over other types such as reel mowers, particularly in the homeowner field for mowing lawns. A rotary mower conventionally comprises a housing in which a rotor is mounted for rotation about a generally vertical axis. The rotor has outer cutting edges traveling in a generally horizontal plane although sometimes the cutting plane may be slightly tilted downwardly toward the front of the mower with a corresponding tilt of the vertical axis. Such tilts are included herein within the horizontal and vertical terminology. Also the terms are with respect to ground, since both level and sloping surfaces may be mowed.

The housing of a rotary mower conventionally has a deck with a skirt which extends downwardly to approximately the height of the blade cutting plane and the entire area swept by the blade is generally open to the ground surface. A gasoline or electric motor is mounted on the deck, with a vertical shaft to which the rotor is attached. In tractor units, power take off may be provided from the tractor motor.

Cutting by rotary mowers is accomplished by the high speed impact of the cutting blades on the grass. In the past, tip velocities exceeding 20,000 feed (6100 meters) per minute have been employed. Such mowers have been recognized to be highly dangerous to the feet (or hands) of a user, and to nearby persons since stones, etc. may be thrown with great velocity. Nevertheless, the relative simplicity and lower cost as compared to reel and other types of mowers, the greater ease of sharpening, and the ability to cut tall as well as short grass, has resulted in wide-spread use of the rotary mower.

In recent years, efforts to reduce rotary mower dangers have included: lower blade tip speeds, trailing shields, discharge chute shields, safety interlocks, and blade guards. These safety features however have in many instances reduced the efficiency of the mower. For example lower tip speeds generally result in poorer cutting performance and increased plugging. Trailing shields provide some protection to the operator but particularly when high grass is being mowed are often a nuisance. Shields over the discharge chute reduce the danger of thrown debris but often increase plugging. The result is that safety features are some times bypassed or made ineffective by the operator in an attempt to improve mower performance or remove a nuisance.

A cross flow mower of the rotary type such as disclosed in U.S. application Ser. No. 970,197 provides a mower which has all of the advantages of a rotary mower but because it utilizes a cross flow principal, allows it to be combined with structure, such as a protective lower wall positioned between the ground and a large part of the path swept by the rotor blades, which overcomes the dangers associated with conventional cross flow blowers as outlined above. The mower of that application employs radial expansion in the housing surrounding the rotor to form and stabilize a vortex which in turn induces a cross flow of air through the rotor path from an inlet region to an outlet region of the mower.

The rotors of cross flow blowers conventionally have large axial to radial dimensions such that air flows predominantly transverse to the rotor axis with the result that to date only radial expansion of the housing has been practical to create and stabilize the vortex inducing the cross flow. This is because air cannot flow axially with respect to rotors over long distances in any efficient manner.

A problem with cross flow blowers generally is that they are sensitive to changes in back pressure as may occur in a mower when the outlet becomes plugged or partially plugged by cuttings. Changes in back pressure tend to shift or move the vortex which in turn effects the performance of the blower.

It is therefore an object of my invention to provide for a cross flow rotary type mower which will include a means for stabilizing the position of the vortex thus improving the safety of the mower while at the same time preserving the excellent performance of such mowers in handling of clippings without plugging.

It is a further object of the invention to provide for a mower construction which will use an axial expansion of a portion of the housing to stabilize the vortex to insure effective cross flow blower action notwithstanding changes in back pressure.

DISCLOSURE OF THE INVENTION

In accordance with the invention, a cross flow rotary mower comprises a rotor mounted for rotation about a generally vertical axis and a driving means therefor. The rotor has generally horizontal outer cutting edges and upwardly extending blower vanes spaced outwardly from the rotor axis. An upper wall which may comprise the deck of the mower and side walls, and preferably a lower wall, together form a conduit cooperating with the rotor to form a cross flow blower having an inlet region and an outlet region angularly spaced downstream from the inlet region. The inlet region opens in the forward direction of travel of the mower and preferably has a lateral dimension at least as great as a major portion of the tip circle diameter of the rotor during mowing with an inward flow of air substantially throughout the inlet region. The cutting edges and blower vanes travel within the conduit during at least substantially a semi-circle of rotation of the rotor. An extension of the upper wall preferably extends forward substantially beyond the tip circle of the rotor and front and side skirt portions extend downwardly from the extension.

Preferably the lower wall extends over a substantial portion of the area of rotation of the rotor including substantially the semi-circle of travel of the cutting edges rearward of the inlet region and the cutting edges extend beyond the lower wall in a major portion of the forward semi-circle of travel of the cutting edges during normal mowing operation. The conduit includes means cooperating with the rotor for producing vortex air flow on one side of the rotor axis near the region where the blower vanes pass from the outlet to the inlet regions. Also, the conduit contains means cooperating with the rotor to induce air cross flow from inlet to outlet regions.

As will be understood from the structure described so far, the rear half of the rotor travel is within the conduit walls and practically completely shields the operator both from contact with the blades and from flying objects struck by the blades. The outlet may be positioned so that any exiting objects are thrown away from the operator position, and in any event can be provided with a protective cover or connected to a bag. Also, with front and side skirt portions extending to or below the plane of the cutting edges, the possibility of throwing objects in the forward semi-circle around the mower is greatly reduced or largely eliminated.

Further, the lower wall provides substantial protection against scalping the lawn at the top or bottom of a terrace, etc., particularly when the lower wall extends into the forward semi-circle of blade travel beneath the rotor.

The air current under the cutting edges in the forward semi-circle has an upward as well as inward component, as will be described more fully hereinafter, thereby providing a lifting action which facilitates mowing many types of grasses.

The means for producing the internal off center vortex air flow comprises an axial expansion of the conduit surrounding the rotor formed by a raised portion of the upper wall extending above the level of the upper wall at the intake region. The height of the raised portion may be similar in height to that of the discharge area. As a result, an axially expanded vortex chamber is formed between the end of the discharge area and the beginning of the intake region which stimulates free circulation of the vortex air flow while allowing the blades of the rotor to pass under the circulating vortex air without paddling or moving it along with the blades. The relatively abrupt wall formed by the change in height of the upper wall between the vortex chamber and the beginning of the intake region locks the vortex in place.

Preferably the means for producing vortex air flow includes a vortex air flow control vane extending downwardly from the upper wall of the conduit over the path of travel of the rotor on one side of the axis and adjacent to the outlet region. A radius to the inner end of the vane lies angularly ahead of a radius to the outer end with respect to the direction of rotation of the rotor. The vane may be positioned so that the central region or core of the vortex lies rearward of the vane with respect to the direction of rotation of the rotor.

The means for inducing cross flow may also comprise a change in conduit thickness. The upper wall may be depressed across the intake region providing an air inlet channel to the conduit which accommodates the rotor and air moving blade height with suitable clearance both top and bottom. Near the end of the intake region, the upper wall may rise gradually in a smooth fashion toward the beginning of the discharge region until the conduit thickness is more than twice as great at the discharge region as at the intake region. This large change in cross section provides substantial axial expansion to promote good cross flow at essentially no increase in cost of manufacturing the conduit.

DESCRIPTION OF PREFERRED EMBODIMENTS OF THE INVENTION

Figure 1:
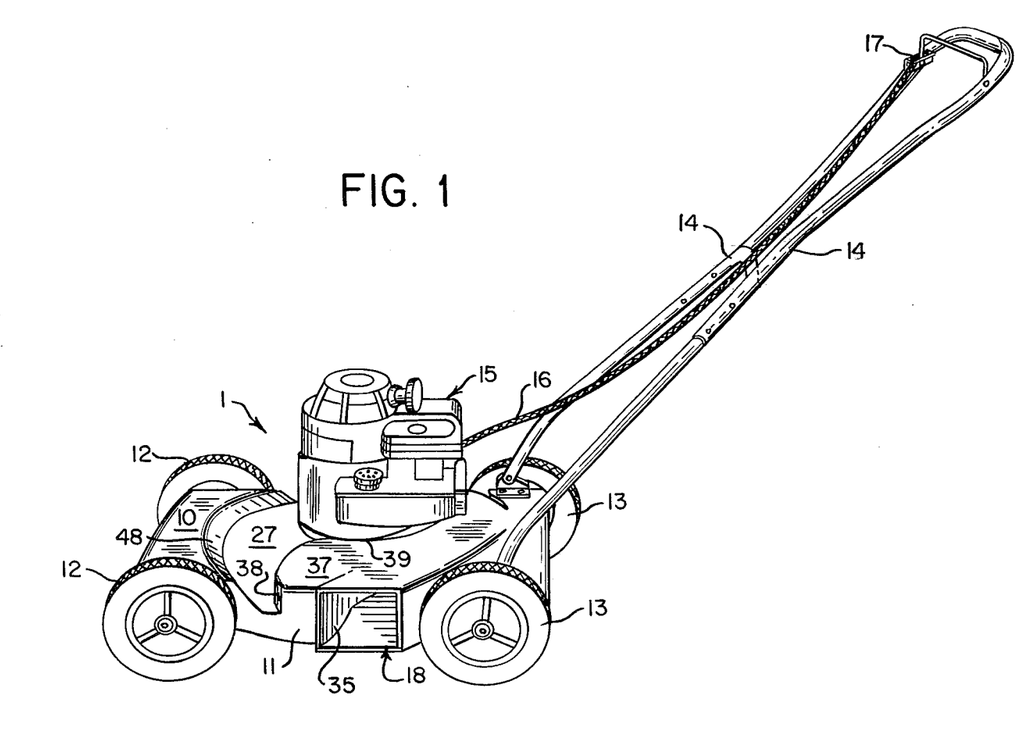
FIG. 1 is a perspective view of one embodiment of a cross flow rotary mower constructed according to the invention.

Referring to FIG. 1, a lawn mower is shown having a housing or carriage 1 with a deck 10, a skirt 11, front wheels 12, rear wheels 13, and a handle 14. Driving means which may comprise a gasoline motor 15 is mounted on the deck 10 and controlled through a cable 16 by a control mechanism 17 attached near the top of the handle. An outlet 18 is shown at the side for discharging grass clippings. Normally the outlet 18 will be covered by a downwardly opening deflector, but is here shown uncovered for clarity.

Figure 2:
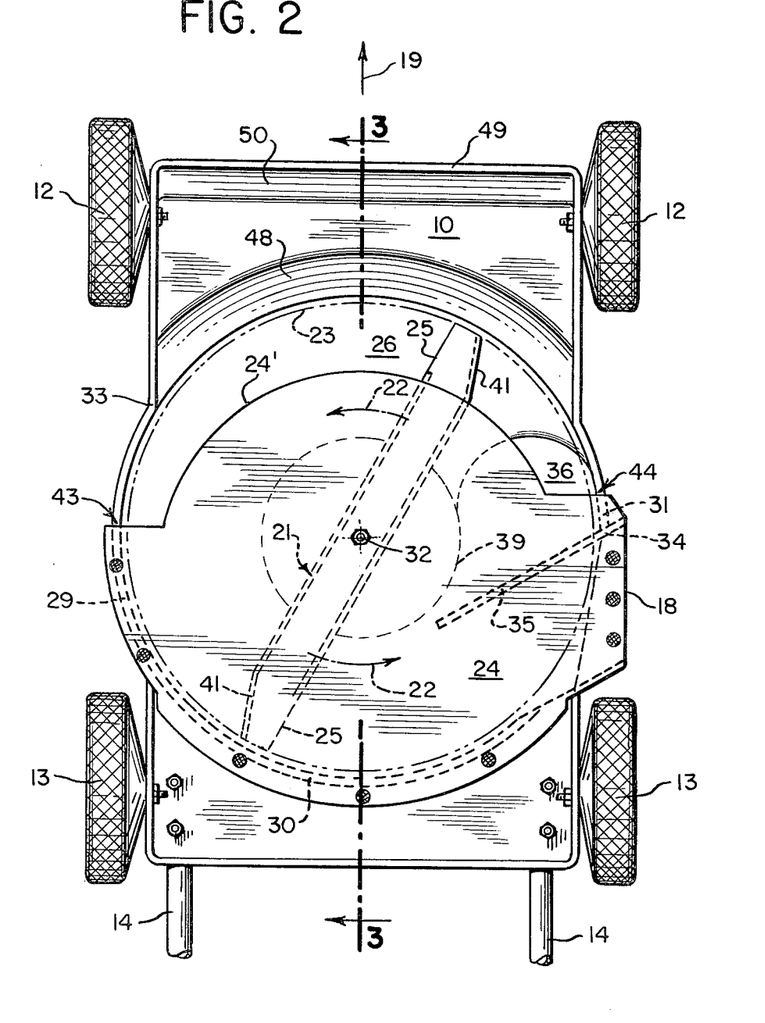
FIG. 2 is a bottom view of the mower of FIG. 1.
Figure 3:
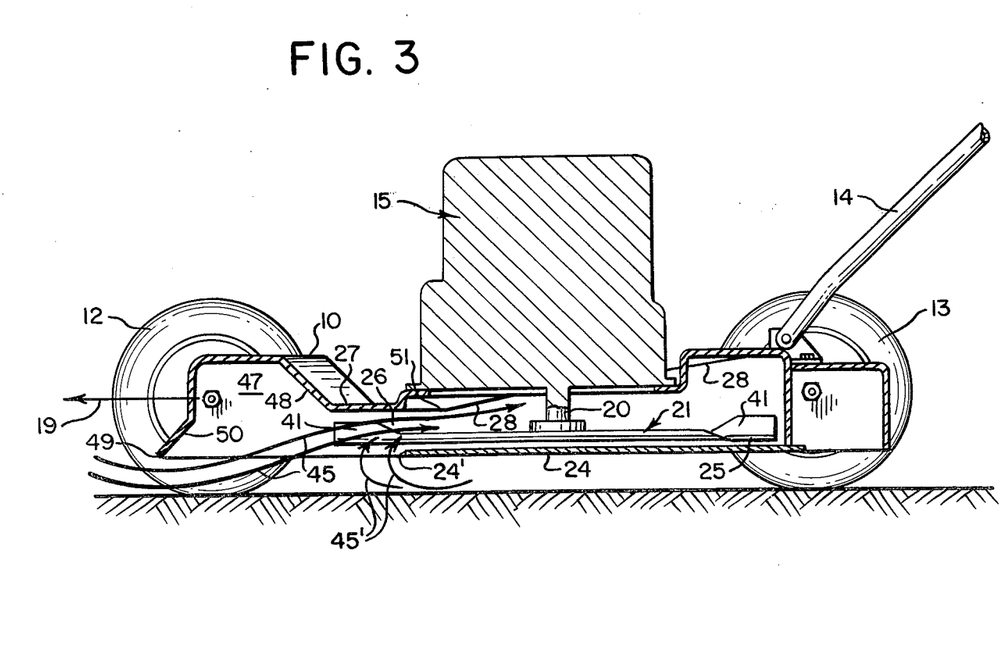
FIG. 3 is a longitudinal cross-section along line 2—2 of FIG. 2 illustrating air flow in the mower of FIG. 1.

Referring to FIGS. 2 and 3 which illustrate the bottom of the mower, and a longitudinal cross section of the mower arrow 19 indicates the forward direction of travel. As shown, the motor 15 has a vertical shaft 20 to which a rotor 21 is attached. The direction of rotation of the rotor is indicated by arrows 22 and the tip circle of the rotor by dot-dash line 23. A bottom plate 24 is attached to the housing and covers a large portion of the area of rotation of the rotor (the area within tip circle 23) including the rear semi-circle of travel and substantially the entire forward semi-circle of travel within the cutting edges 25 of the rotor. The front edge 24' of the bottom plate is rearward of the tip circle 23 so that the cutting edges at the outer ends of the rotor 21 extend beyond the bottom plate in the major portion of the forward semi-circle of travel.

The bottom plate 24 and the portion of the deck 10 above it form lower and upper walls of a conduit for an axially expanded cross flow blower. As shown in FIG. 3 the conduit is narrow in height at inlet region 26 due to the depressed area 27 in deck 10. The deck 10 expands vertically or axially of the rotor along surface 28 of deck 10 starting at line 51' to a maximum conduit thickness at the discharge area 18. The side walls of the conduit are formed on one lateral side by the wall 29, on the rear side by the inner wall 30, and on the other lateral side by the wall 31. Walls 29, 30 and 31 extend downwardly from deck 10 and may be formed as part of deck 10 as shown in FIG. 2, the side walls 29, 30, and 31 are substantially equally spaced from the center of rotation 32 of rotor 21 except in the intake and discharge regions.

Figure 4:
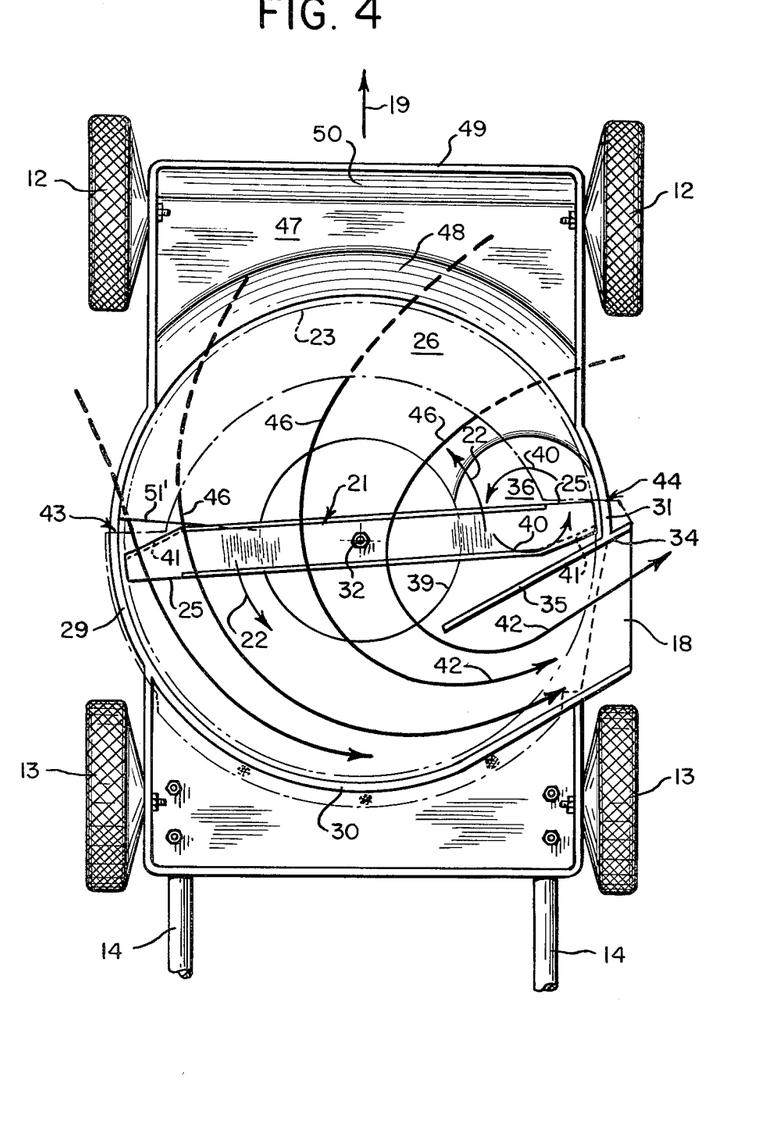
FIG. 4 is a view similar to FIG. 2 but with the bottom wall or plate removed.

The portion of the wall 29 at point 33 may be considered as a first vortex breaker, and point 34 of wall 31 may be considered as a second vortex breaker. Vane 35 shown in FIG. 4 and FIG. 1 improves the vortex action of air flow in vortex chamber 36 which is located under area 37 of deck 10. The vortex chamber is not entirely sealed since rotor 21 passes through the lower portion thereof. However, the vortex chamber is bounded by area 37 of deck 10 on top, vane 35 at the rear, wall 31 on the side, deck section 38 on the front and part of the other side and further on the inner side by the motor 15 mounting arrangement which is a further depression in deck 10 at 39. The substantial vertical area of vortex chamber 36 provides a low pressure, high velocity space for vortex circulation of the air flow shown by arrows 40. The vortex is trapped in position by deck section 38 as the rotor 21 passes forwardly underneath deck section 27. The outer air vanes 41 of rotor 21 shown in FIG. 3 protrude vertically into the lower part of the vortex chamber 36 to enhance the air circulation. As the air vanes 41 extend radially inward to substantially the center of vortex chamber 36, the air circulation forms a counter clockwise vortex, as shown in FIG. 4. This vortex is also pushed into circulation by friction from discharging air as shown by arrows 42 where some of the energy of the discharge air is coupled under vane 35 to the vortex circulation shown by arrows 40.

While FIGS. 3 and 4 illustrate the general type of air flow present, it should be understood that the air flow patterns may be quite complicated and are difficult to determine and illustrate with complete accuracy. Nevertheless it is believed that the patterns shown are adequate to explain how the mower functions.

The inlet region of the blower conduit as shown in FIG. 2 extends between the forward edge of the bottom plate 24 and the corresponding depressed region 26 of deck 10 there above. The lateral extent of the inlet region extends from point 44 of wall 31 to point 43 of wall 29 as shown in FIG. 4. Thus the inlet region opens in the forward direction of travel of the mower, and its lateral extent is approximately as great as the tip circle diameter. Air flows upwardly and inwardly substantially throughout the inlet region.

Within the lower part of the conduit, the air flow is principally in planes parallel to the bottom plate 24. However in the upper part of the conduit the air flow is principally in planes parallel to the slope 28 of deck 10. In the region between the upper and lower part of the conduit, the air flow is principally in planes suitably spaced from the lower and upper planes of air flow. Thus the air flows in non-parallel planes expanding upward as the air flow progresses from intake to discharge. This expansion in volume results in lower pressure and higher velocity enhancing the cross flow of air.

The previously described vortex air flow shown by arrows 40 is contained substantially within the conduit and is in the same direction of rotation as that of the rotor. Curved lines 46 indicate that the major portion of the air flows in paths from in front of the mower past the blower vanes 41 when they are in the inlet region, then through the interior of the blower, and then past vanes 41, when they are in the outlet region 18 resulting in a cross flow effect with respect to the rotor.

Thus the cross flow blower (sometimes called a transverse-flow blower) is characterized by most of the air passing over the blower vanes at least twice in a direction transverse to the axis of the rotor, and in passing from inlet to outlet, is accompanied by a vortex air flow such as indicated by arrows 40. It should be understood that the position and size of vortex 40 may vary from that specifically shown, depending on numerous factors including the detailed design of the blower vanes 41, the housing, and the spacing involved, however, the drawings show the general character of the air flow produced.

FIG. 3 shows the vertical cross section of air flow which is characterized by lines 45 and 45'. As shown, air flow 45 under the forward skirt flows rearwardly upward and inward. Air flow 45' flows generally upward and rearward into the conduit. The substantial upward component of air flow vacuums the grass upward allowing blade edges 25 on the rotor to cut the grass. The inward flow of air blows the clippings through the conduit and through the discharge area 18. Area 47 under the forward part of deck 10 provides a clear area where long grass can bend upward to engage blade edges 25. The upward bending of grass is controlled or limited by forward edge 24' of bottom plate 24 and sloped section 48 of deck 10. The length of grass which bends upward for very stiff grass is limited by the distance between the forward edge 24' of bottom plate 24 and the lower edge 49 of front skirt 50. By suitable choice of dimensions the mower will generally limit the maximum length of grass which will bend upward to be cut. This limits potential plugging of the mower. As previously described, the limited intake height also limits the amount of debris which may be ingested to further prevent plugging.

The lower portion of front skirt 50 is sloped forwardly to accommodate some turbulence which may be present as air flows inward under edge 49 and interacts with air flow 45' from under bottom plate 24. Forward motion of air at front skirt 50 in the form of turbulence is deflected downward toward the ground to minimize turbulence in the intake region 26.

Adequate, well directed air flow allows the employment of fairly low tip speeds of 10,000 to 13,000 feet per minute with success, and lower tip speeds are possible depending on the types, thickness, and heights of grass to be mowed.

Figure 5:
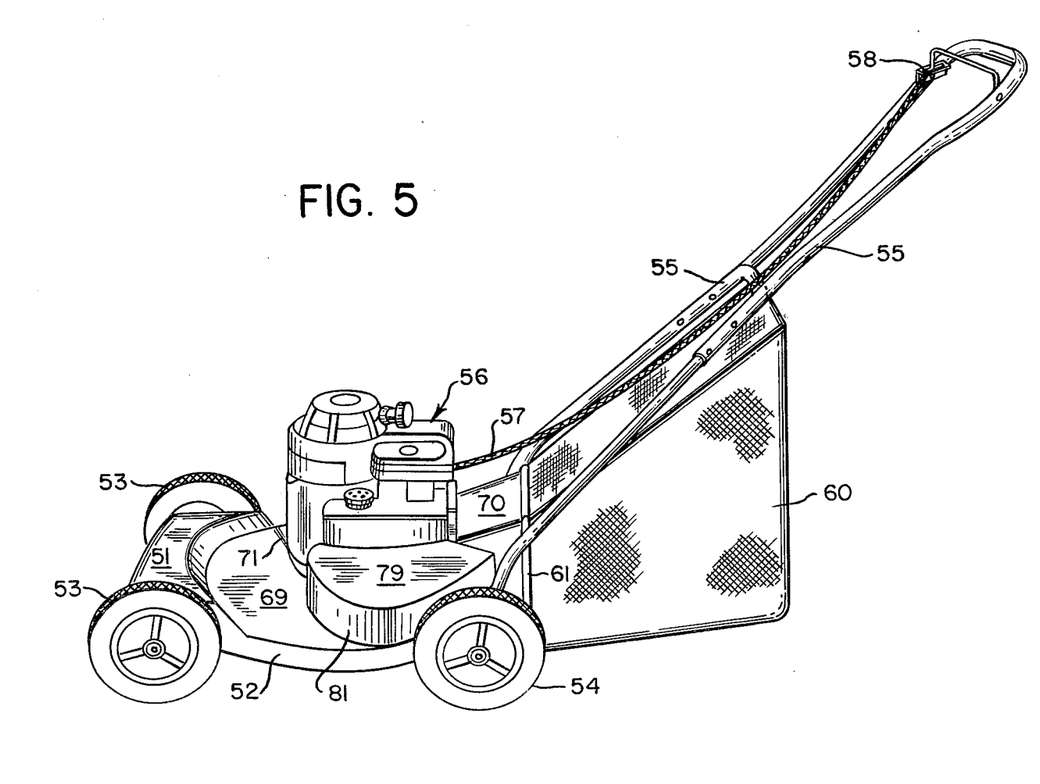
FIG. 5 is a perspective view of a further embodiment of a cross flow rotary mower constructed according to the invention.
Figure 6:
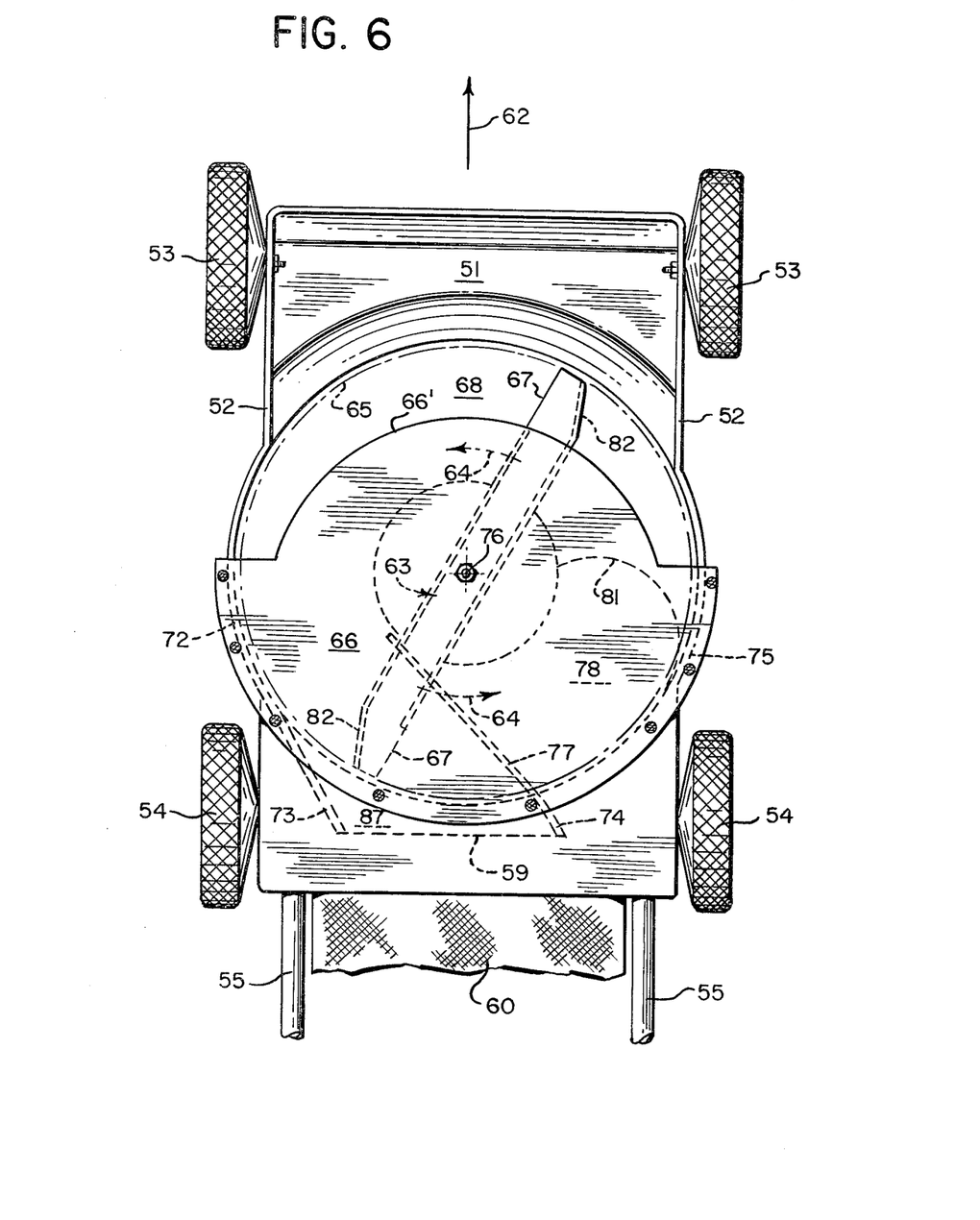
FIG. 6 is a bottom view of the mower of FIG. 5.

Referring to FIG. 5, a lawn mower of the rear discharge, rear bagging type is shown having a housing or carriage with a deck 51, a skirt 52, front wheels 53, rear wheels 54, and a handle 55. Driving means in the form of a gasoline motor 56 is mounted on deck 51 and controlled through cable 57 by a control mechanism 58 attached near the top of the handle. An outlet 59 as shown in FIG. 6 discharges grass clippings rearwardly and upwardly into bag or grass catcher 60. Bag 60 would be disengaged for emptying at junction 61 and many mechanisms are available for this purpose. For safety purposes, safety interlock means are provided to ensure that the mower rotor is inoperable while the bag is unattached.

Arrow 62 as shown in FIG. 6 indicates the forward direction of travel. The rotor 63 is mounted on the vertical shaft of motor 56. The direction of rotation is indicated by arrows 64 and the tip circle by dot-dash line 65. The bottom plate 66 is attached to the housing and covers a large portion of the area of rotation of the rotor (the area within tip circle 65) including the rear semi-circle of travel and substantially the entire forward semi-circle of travel within the cutting edges 67. The front edge 66' of the bottom plate 66 is rearward of the tip circle 65 so that the cutting edges at the outer ends of the rotor 63 extend beyond the bottom plate in the major portion of the forward semi-circle of travel.

Figure 8:
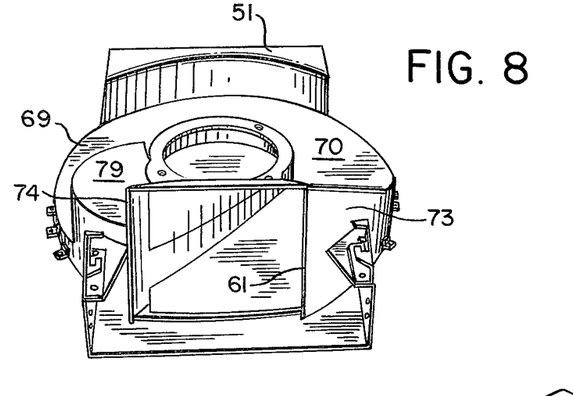
FIG. 8 is a perspective view of the discharge region of the housing used with the mower of FIG. 5.
Figure 9:
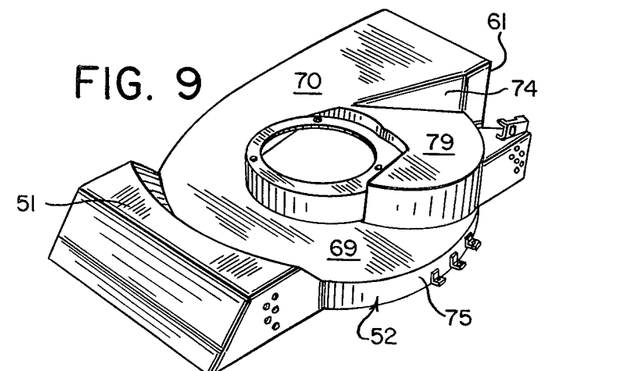
FIG. 9 is a perspective view of the inlet region of the housing of FIG. 8.

The bottom plate 66 and the portion of deck 51 above it form lower and upper walls of a conduit for an axially expanded cross flow blower. The conduit is narrow in height at the inlet region 68 due to the depressed area 69 in deck 51. The deck 51 expands axially along surface 70 of deck 51 as shown in FIGS. 5, 8 and 9 starting at line 71 to a maximum conduit thickness at junction 61. The side walls of the conduit are formed on one side by wall 72, discharge chute wall 73, and on the other side by chute wall 74 and side wall 75. Walls 72, 73, 74, and 75 extend downwardly from deck 51 and may be formed as part of deck 51.

The side walls 72 and 75 are substantially equally spaced from the center of rotation 76 except where wall 72 joins wall 73 at the discharge 59 and in the intake region forward of the tip circle 65.

Figure 7:
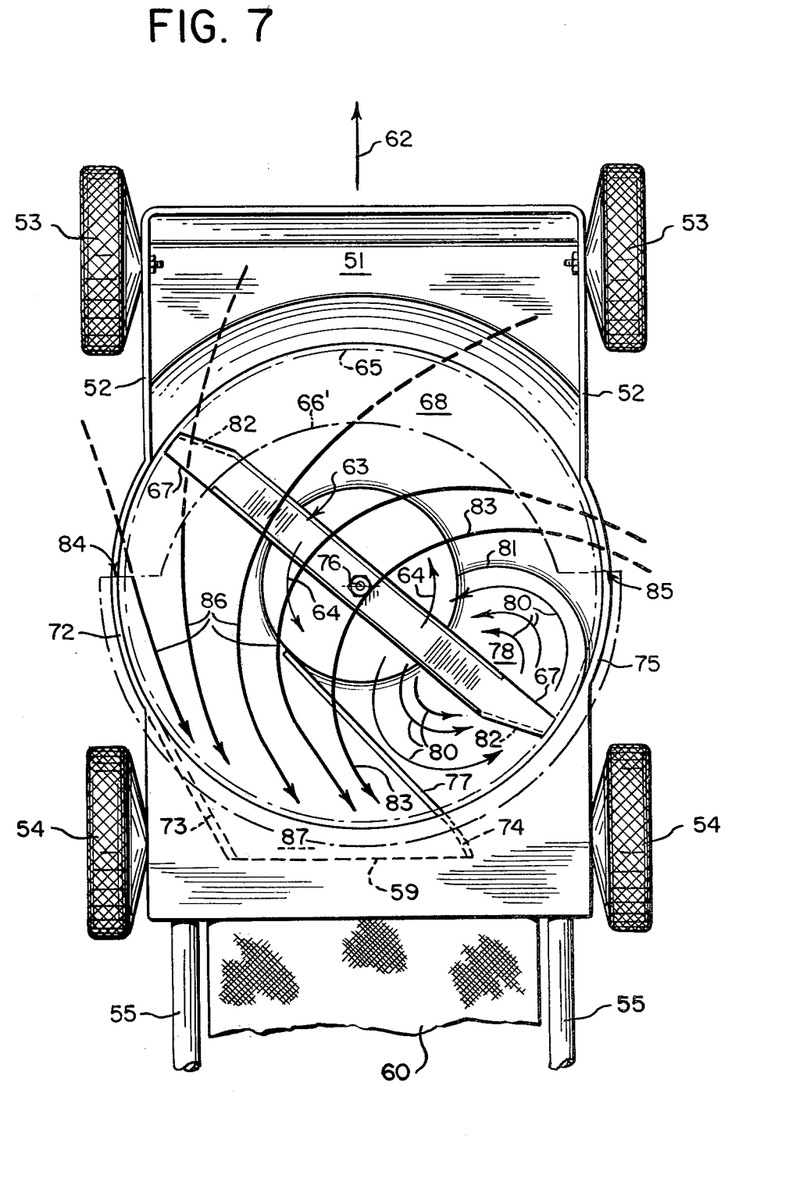
FIG. 7 is a view similar to FIG. 6 but with the bottom wall or plate removed.
Figure 10:
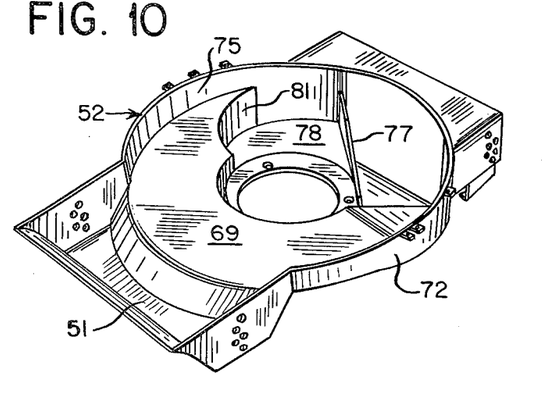
FIG. 10 is a perspective view of the bottom of the housing of FIG. 8.

A vane 77 as shown in FIGS. 6, 7 and 10 improves the vortex action in chanber 78 which is located under area 79 of deck 51. Vane 77 also aids in preventing recirculation of grass clippings, particularly when bag 60 is overfilled. Vortex chamber 78 is not entirely sealed since rotor 63 passes through the lower portion thereof. It has been found that a somewhat larger and thicker vortex chamber enhances cross flow mower operation for rear discharge while a somewhat smaller diameter vortex chamber of shallower construction provides satisfactory operation for side discharge mowers. The large vortex chamber 78 provides a low pressure, high velocity volume for the vortex circulation shown by arrows 80 in FIG. 7. The vortex is trapped in position by wall 81 which prevents it being swept forward by rotor 63 as it passes through the bottom of chamber 78 to the intake region under deck area 69. The outer vanes 82 of rotor 63 protrude vertically into the lower part of vortex chamber 78 to enhance the air circulation. As shown by arrows 80 the vortex circulates in the same direction as rotor 63 as shown by arrows 64, but the vortex circulation as shown by arrows 80 is offset from the center of rotor rotation 76. The vortex circulation is also aided by friction with the intake air as shown by arrow 83 which passes inwardly and by friction with the exhaust air as shown by the continuation of arrow 83. Preferably the vane 77 extends only a fraction of the thickness of the conduit yielding considerable clearance for rotation of rotor 63. As in the previously described embodiment, it should be understood that the air flow patterns may be quite complicated and are difficult to determine and illustrate with complete accuracy, however, it is believed that the patterns shown are adequate to explain how the mower functions.

The inlet region of the blower conduit is between the foward edge 66' and corresponding depressed region 69 of the deck 51 there above. The lateral extent of the inlet region is from point 84 of wall 72 to point 85 of wall 75. Thus the inlet region opens in the forward direction of travel of the mower, and the lateral extent of approximately as great as the tip circle diameter. Air flows upwardly and inwardly substantially throughout the inlet region.

Within the lower portion of the conduit the air flow is principally in planes parallel to the bottom plate 66. However in the upper part of the conduit, the air flow is principally in planes parallel to the slope 70 of deck 51. In the region between the upper and lower part the air flows in planes suitably spaced from the upper and lower planes of air flow. Thus the air flows in non-parallel planes expanding upward as the air flow progresses from the intake or inlet region to the discharge or outlet region.

The previously described vortex air flow shown by arrows 80 is contained substantially within the conduit. Curved lines 86 indicate that the major portion of the air flows in paths from in front of the mower past blower vanes 82 when they are in the inlet region, then through the interior of the blower, and then past vanes 82 when they are in the outlet region 87. The size of the vortex shown by arrows 80 is larger than was described in the previous embodiment and, in any case, the vortex circulation may vary according to such factors as blower vane design, housing shape and blade tip speed.

It will be appreciated that the embodiments described are structurally simple, and economical to manufacture. The bottom plate precludes the need for a trailing shield now required on conventional rotary mowers. Further by combining the mounting bracket for the rear or front or both sets of wheels with the bottom plate, the user could be discouraged from using the mower without the bottom plate.

Cross flow rotary mowers constructed as described above have features which greatly reduce or largely eliminate mowing hazards, without reducing and indeed enhancing the performance of rotary mowers. Mowers with several rotors for use on tractors may be used with minor modifications. The power for the rotors may be obtained from the tractor engine using any of many rotor drives available.

A further feature of a cross flow rotary mower having the axially expanded vortex chamber is that it performs as an excellent mulcher when the outlet region is closed off by a conventional closure (not shown in the drawings). This is because the axially expanded vortex chamber stabilizes and positions the vortex in its proper position even when back pressure is increased when the closure at the outlet region is closed thus assuring that an efficient cross flow of air is maintained to lift grass and debris into contact with the cutting edges of the rotor. In cross flow rotary mowers utilizing radial expansion of the housing surrounding the blower, closure of the outlet region increases back pressure which results in a shifting of the vortex thus decreasing efficiency of the cross flow of air and reducing lifting effect on grass and debris into contact with the cutting edges of the rotor.

I claim:

1. A cross flow rotary mower having:
   (a) a rotor mounted for rotation about a generally vertical axis, said rotor having generally horizontal outer cutting edges and upwardly extending blower vanes spaced outwardly from the rotor axis;
   (b) driving means for rotating the rotor;
   (c) a housing surrounding the rotor having an upper wall, a bottom plate and side walls for forming a conduit cooperating with said rotor to form a cross flow blower having an inlet region and an outlet region angularly spaced downstream in the direction of air flow through said blower from said inlet region;
   (d) said conduit including means cooperating with said rotor when said rotor is rotated to produce vortex air flow on one side of the rotor axis near an area where said blower vanes pass from said outlet region to said inlet region;

(e) said bottom plate extending under a substantial portion of the area of rotation of said rotor including substantially a semi-circle of travel of said cutting edges rearward of said inlet region;

(f) said cutting edges extending beyond said bottom plate in a major portion of a forward semi-circle of travel of the cutting edges; and, (g) said upper wall having an axially expanded section at said area where said blower vanes pass from said outlet region to said inlet region to form an axially expanded vortex chamber whereby said vortex air flow is stabilized and positioned in said chamber during operation of said mower.

2. A mower according to claim 1 wherein the vertical height of said inlet region is less than the vertical height of said outlet region.

3. A mower according to claim 2 wherein the upper wall of said housing extending from said inlet region to said outlet region has a portion thereof sloping upwardly between said inlet and outlet regions.

4. A mower according to claim 3 wherein a vertical axially extending wall connects the upper wall adjacent the outlet region with the upper wall adjacent the inlet region, said vertical wall exxtending in the interior of said housing to form an axially extending side of said vortex chamber.

5. A mower according to claim 1 wherein the outlet region is located at a lateral side of said mower.

6. A mower according to claim 1 wherein the discharge region is located at the rear of said mower opposite to the direction of travel of said mower.

7. A cross flow rotary mower having:

(a) a rotor mounted for rotation about a generally vertical axis, said rotor having generally horizontal outer cutting edges and upwardly extending blower vanes spaced outwardly from the rotor axis;

(b) driving means for rotating the rotor;

(c) a housing surrounding the rotor having an upper wall, a bottom plate and side walls for forming a conduit cooperating with said rotor to form a cross flow blower having an inlet region and an outlet region angularly spaced downstream in the direction of air flow through said blower from said inlet region;

(d) said conduit including means cooperating with said rotor when said rotor is rotated to produce vortex air flow on one side of the rotor axis near an area where said blower vanes pass from said outlet region to said inlet region;

(e) said upper wall having an axially expanded section at said area where said blower vanes pass from said outlet region to said inlet region to form an axially expanded vortex chamber whereby said vortex flow is stabilized and positioned in said chamber during operation of said mower;

(f) said inlet region opening in the forward direction of travel of the mower and having a lateral extent approximately as great as the tip circle diameter of the rotor during normal mowing with inward flow of air substantially throughout said inlet region;

(g) a raised portion of said upper wall extending forward beyond the tip circle of said rotor and a skirt portion extending downward from said raised portion to form a chamber in which long grass may bend upwardly under the force of air flow pouring into said inlet region to be cut by said cutting edges; and, (h) said bottom plate extending between said side walls beneath said rotor with the forward end of said bottom plate being spaced from said chamber whereby the distance between the forward end of said plate and said chamber determines the length of grass that may be cut.

8. A cross flow rotary mower having:

(a) a rotor mounted for rotation about a generally vertical axis, said rotor having generally horizontal outer cutting edges and upwardly extending blower vanes spaced outwardly from the rotor axis;

(b) driving means for rotating the rotor;

(c) a housing surrounding the rotor having an upper wall and side walls for forming a conduit cooperating with said rotor to form a cross flow blower having an inlet region and an outlet region angularly spaced downstream in the direction of air flow through said blower from said inlet region and wherein the vertical height of said inlet region is less than the vertical height of said outlet region to limit debris that may be blown through said mower and to prevent plugging of the outlet region;

(d) said conduit including means cooperating with said rotor when said rotor is rotated to produce vortex air flow on one side of the rotor axis near an area where said blower vanes pass from said outlet region to said inlet region; and (e) said upper wall having an axially expanded section at said area where said blower vanes pass from said outlet region to said inlet region to form an axially expanded vortex chamber whereby said vortex flow is stabilized and positioned in said chamber during operation of said mower.

* * * * *